United States Patent [19]

Astrachan et al.

[11] Patent Number: 5,173,658
[45] Date of Patent: Dec. 22, 1992

[54] INDUCTIVE PROXIMITY SENSOR WITH FORCE TRANSFERRING SUPPORT POST FOR USE IN HIGH PRESSURE ENVIRONMENTS

[75] Inventors: Paul M. Astrachan, Freeport; Thomas A. Fletcher, Freeport, both of Ill.

[73] Assignee: Honeywell Inc., Minneapolis, Minn.

[21] Appl. No.: 447,288

[22] Filed: Dec. 7, 1989

[51] Int. Cl.⁵ .................. G01B 7/30; H01F 17/04; H01F 27/24
[52] U.S. Cl. .................. 324/207.12; 324/207.16; 324/207.19; 324/225; 336/92; 336/221
[58] Field of Search .................. 324/207.12, 207.15, 324/207.19, 207.25, 207.26, 173, 174, 225, 234, 236–238; 73/660, 661; 336/65, 90, 92, 221

[56] References Cited

U.S. PATENT DOCUMENTS

| | | | |
|---|---|---|---|
| 2,478,983 | 8/1949 | Runbaken et al. | 336/92 |
| 2,766,427 | 10/1956 | Brownlow | 336/92 X |
| 3,942,045 | 3/1976 | Palazzetti | 324/174 X |
| 4,612,501 | 9/1986 | Costello et al. | 324/207.25 X |
| 4,680,543 | 7/1987 | Kohen | 324/207.15 |
| 4,804,911 | 2/1989 | Saito et al. | 324/207.16 X |
| 4,829,245 | 5/1989 | Echasseriau et al. | 324/207.15 X |
| 4,829,834 | 5/1989 | Masom | 324/174 X |

Primary Examiner—Gerard R. Strecker
Attorney, Agent, or Firm—Charles L. Rubow

[57] ABSTRACT

A high pressure proximity sensor for high pressure environments uses a balanced bridge variable inductance magnetic core structure to detect the presence of a external ferrous object by a change in inductance. The sensor magnetic flux path is defined by the sensor's specific geometry which includes core windings on the core and a sensor housing. The core includes a center post of a nonmagnetic material to transfer stress from a housing sensor face to the core's symmetric axis to cancel the effect of an external pressure induced stress on the sensor. The center post is encircled by an elastomer barrier between the housing sensor face and an adjacent end of the internal core to prevent migration of an internal potting compound between the core end and the sensor face. This structure provides satisfactory sensor operation in environments imposing shock and vibration on the sensor as well as high external pressures.

10 Claims, 1 Drawing Sheet

INDUCTIVE PROXIMITY SENSOR WITH FORCE TRANSFERRING SUPPORT POST FOR USE IN HIGH PRESSURE ENVIRONMENTS

BACKGROUND OF THE INVENTION

1. Field of the Invention

The present invention is directed to proximity sensors. More specifically, the present invention is directed to a proximity sensor for high pressure environments.

SUMMARY OF THE INVENTION

An object of the present invention is to provide an improved proximity sensor for use in high pressure environments.

In accomplishing this and other objects, there has been provided, in accordance with the present invention, a proximity sensor having a magnetic field core structure, a housing containing the magnetic field core structure and a sensor face and a support post extending between the magnetic field structure and the sensor face of the housing and coaxially aligned on a symmetric axis of the magnetic field structure.

BRIEF DESCRIPTION OF THE DRAWING

A better understanding of the present invention may be had when the following detailed description is read in connection with the accompanying single figure drawing showing a cross-sectional illustration of the proximity sensor of the present invention.

DESCRIPTION OF THE PREFERRED EMBODIMENT

Figure 1:
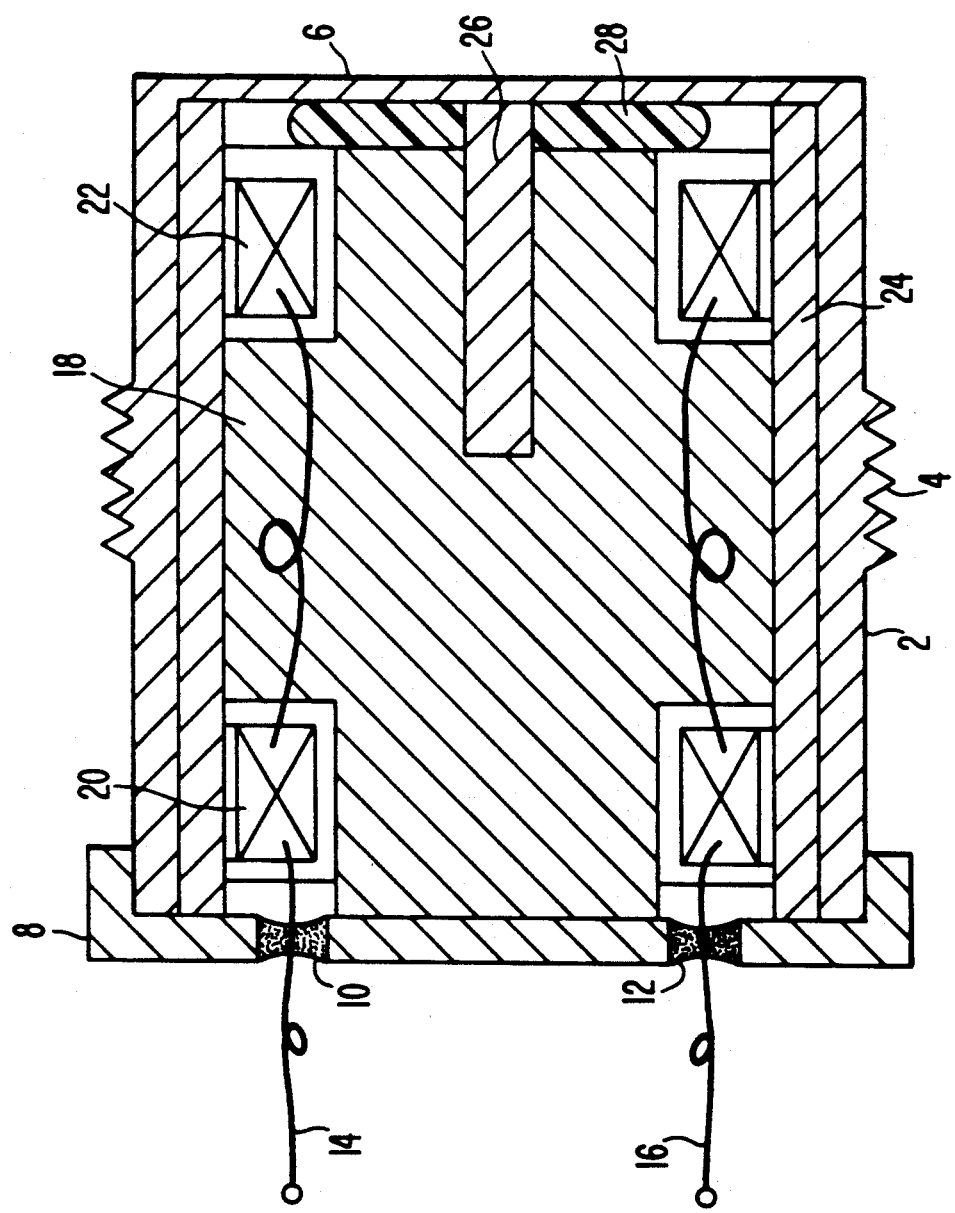

Referring to single figure drawing in more detail, there is shown a proximity sensor having a hollow sensor housing 2 of a suitable material, e.g., 300 series stainless steel, which may incorporate a threaded portion 4 on an external surface thereon to enable the proximity sensor to be mounted in related equipment. The hollow housing 2 is cup-shaped with a bottom of the cup arranged as a sensor face 6. An open end of the housing 2 is closed with a cap 8 having a pair of hermetic seals 10,12 arranged therein. The seals 10,12 are used to enable electrically conductive wires 14,16, respectively, to pass through the cover 8 into the interior of the housing 2.

A sensor core 18 of a suitable magnetostrictive material, e.g., 400 series stainless steel, is located within the housing 2 and is provided with magnetic coils 20,22 wound on respective coil bobbins and arranged to encircle the core 18. The coils 20,22 are connected to the wires 14,16 and are arranged in a balanced bridge variable inductance configuration which is used to detect the presence of an external ferrous object by a change in the inductance, such devices being well-known in the art. A cylindrical insert 24 is located between the core 18 and interior surface of the housing 2 to locate the core 18 therein. This insert may be of a suitable material compatible with the functionality of the proximity sensor, e.g., a low carbon steel material.

A support post 26 is located on one end of the core 18 adjacent to the sensor face 6. The post 26 is coaxially positioned on a central axis of the core 18 and is arranged to project out of the core 18 to contact an inner surface of the sensor face 6. The support post 26 is made of a suitable nonmagnetic material, e.g., 300 series stainless steel. The core 18, on the other hand, is made of a suitable magnetostrictive material, e.g., 400 series stainless steel. An elastomer insert 28 in the form of a ring is arranged to encircle the projecting end of the post 26 and is located between the end of the core 18 and the inner surface of the sensor face 6. This insert 28 may be of a suitable material and configuration such as a bead of silicone.

DESCRIPTION OF THE OPERATION

As is well-known in the art, the proximity sensor detects the presence of an external ferrous object by a change in the inductance of an internal variable inductance device. The sensor magnetic flux path for the magnetic flux produced by the variable inductance device is defined by the specific geometry of the sensor. As a result, the core configuration, housing sensor face thickness, the number of core windings and material properties of the sensor elements all contribute to the sensor characteristics. Due to the operating characteristics desired for a high pressure environment as well as shock and vibration resistant, it is not feasible to increase the thickness of the sensor housing face 6 enough to withstand the effect of such an operating environment. As a result, the sensor design of the present invention is arranged to provide a support post 26 between the end of the core 18 and the sensor face 6 to provide a mechanical support to the sensor face 6.

The operational advantage of the center post 26 may be more fully appreciated by an understanding of the effect of the high pressure environment on the sensor. Because the core 18 is exposed to a substantial load in such an environment, the core permeability changes proportionately to the pressure applied which adversely affects the operating characteristics of the sensor. In conventional sensors, this stress affects the magnetostrictive characteristics of the core material by the stress produced through the sensor face 6 whereby the majority of the flux propagates through the skin of the core 18 where the stress is highest and, consequently, the effect on the inductance is amplified. To overcome this inherent shortcoming in prior art sensors, the nonmagnetic support post 26 provided by the present invention is located in the end of the core 18 on the axis of the symmetry of the core 18. This support post 26 extends between the core 18 and the sensor face 6 to transmit the load from the sensor face 6 to the core's symmetric axis and, thus, cancel the skin effects previously caused by the stress from the external pressure on the sensor housing 6. Further, the present invention improves the core inductance due to an increase in the skin area through which the flux propagates.

Since the sensor is backfilled with epoxy to enable the sensor to operate in extreme shock and vibration environments whereby the internal structure is stabilized by the epoxy fill, an elastomer insert or ring 28 is arranged to encircle the projecting end of the support post 26 and to fill the space between the adjacent end of the core 18 and sensor face 6. This elastomer ring 28 acts a barrier between the housing sensor face 6 and the end of the core 18 to prevent migration of the epoxy fill into this area which could affect the operation of the sensor. The improved structure of the proximity sensor produced by the present invention allows the sensor to withstand extremely high external environmental pressures as well as vibration and shock without thickening the sensor's sensing face 6 and without significantly affecting the desired sensor operating characteristics. Further, these operating characteristics are actually enhanced due to the improved flux path in the core 18.

Accordingly, it may be seen that there has been provided, in accordance with the present invention, an improved proximity sensor for operating in a high pressure environment.

The embodiments of the present invention in which an exclusive property or privilege is claimed are defined as follows:

1. A proximity sensor comprising:
   variable inductance means having a magnetic field core structure extending along a central axis and having first and second ends intersecting the central axis at spatially separated points along the central axis;
   a cup shaped housing having an integral end wall with a sensor face adjacent to said core structure and;
   locating means for mounting said variable inductance means within said cup-shaped housing so that the central axis intersects the sensor face of the integral end wall of said housing, and so that the first end of said magnetic field core structure is proximate the end wall of said housing; and
   a support post coaxially aligned with the central axis of said magnetic field core structure and extending from an interior region in the magnetic field core structure between the first and second ends thereof to the integral end wall of said cup-shaped housing so that said support post is adapted to transfer forces resulting from pressure to which the end wall of said cup-shaped housing is subjected to the interior of the magnetic field core structure without affecting the electrical properties of the skin of said core structure.

2. A sensor as set forth in claim 1 where said post is made of a nonmagnetic material.

3. A sensor as set forth in claim 2 wherein said post is made of 300 series stainless steel.

4. A sensor as set forth in claim 2 wherein said core is made of a magnetostrictive material.

5. A sensor as set forth in claim 4 wherein said core is made of 400 series stainless steel.

6. A sensor as set forth in claim 1 and further including an insert between said core structure and said housing to position said core structure within said housing.

7. A sensor as set forth in claim 6 wherein said insert is made of low carbon steel.

8. A sensor as set forth in claim 1 and further including an elastomer ring located between said structure and said sensor face and encircling said post.

9. A sensor as set forth in claim 8 wherein said ring is made of silicone.

10. A sensor as set forth in claim 1 and including electrical connecting wires extending through said housing to provide electrical connection to said variable inductance means.

* * * * *